May 12, 1942.    T. DANTZIG    2,282,708
COFFEE ROASTING PRODUCT, METHOD, AND MACHINE
Filed Sept. 26, 1940    2 Sheets-Sheet 2
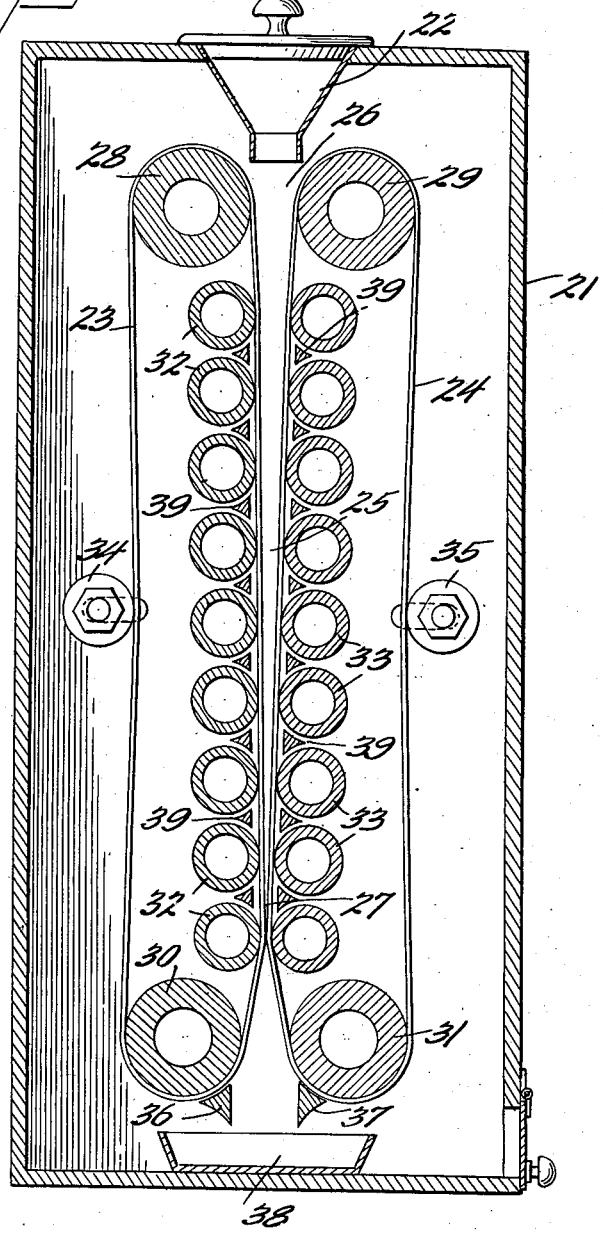
Inventor
Tobias Dantzig,
By Sol Shappirio
Attorney Patented May 12, 1942

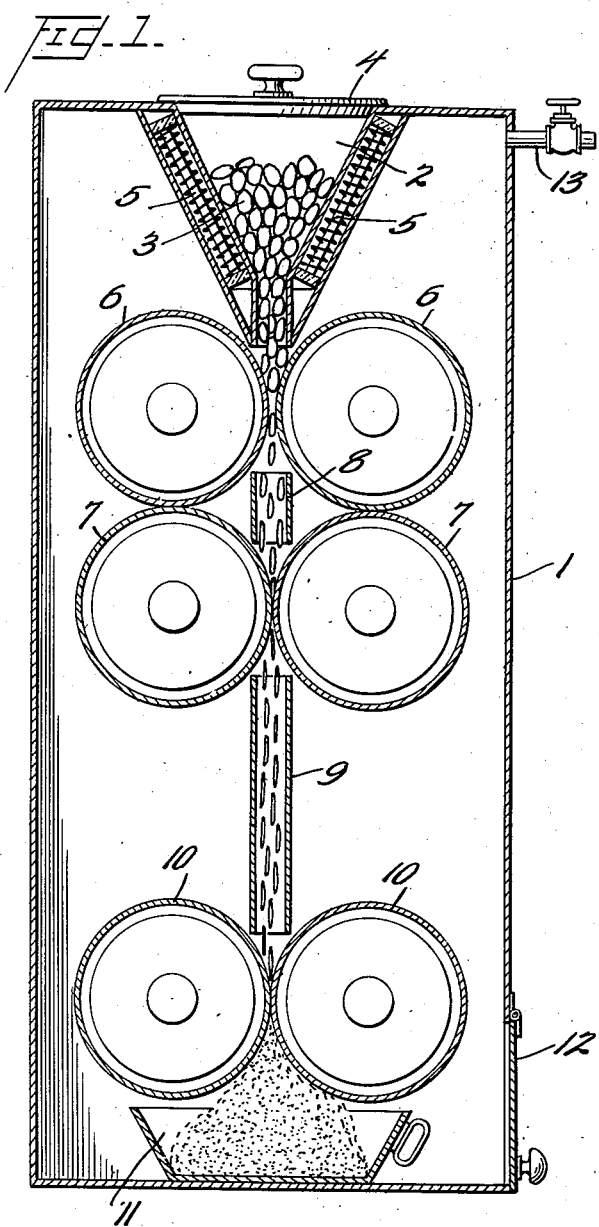

2,282,708

UNITED STATES PATENT OFFICE 2,282,708

COFFEE ROASTING PRODUCT, METHOD, AND MACHINE

Tobias Dantzig, Hyattsville, Md.

Application September 26, 1940, Serial No. 358,530

13 Claims. (Cl. 99—68)

This invention relates to coffee roasting and includes novel products resulting from novel methods and machines or devices for producing roasted coffee.

The roasting of coffee is a well developed art but the limitations of that art as practiced today require the roasting of the coffee bean in substantially centrally located roasting plants from which the roasted coffee is distributed to retail outlets. Handling coffee in this manner and roasting and distribution in this way gives rise to products which when stored over any substantial period of time,—even relatively short periods—result in the development of rancidity in the coffee.

In more recent years there has been a demand for freshly roasted products and in fact daily roasting of coffee is carried out. Such methods, however, result in large losses where the coffee cannot be used because it has been on the shelf for more than a day or longer periods.

Other methods have sought to eliminate the development of rancidity in the roasted coffee, by removal of coffee oil at some stage of the coffee treatment process. While the removal of coffee oil tends to eliminate one of the principal reasons for development of rancidity, removal of the coffee oil entails loss of flavor and aroma which materially affects the quality of the roasted coffee.

Among the objects of the present invention are included coffee roasting methods in which the coffee can be roasted rapidly for use as desired.

Other objects include the production of novel types of coffee products.

Further objects include machines and devices for roasting coffee and producing such products.

Still further objects and advantages of the present invention will appear from the more detailed description given below, it being understood, however, that this more detailed description is given by way of illustration and explanation only, and not by way of limitation, since various changes therein may be made by those skilled in the art without departing from the scope and spirit of the present invention.

In connection with that more detailed description there is shown in the accompanying drawings, in Figure 1, a vertical sectional view through one form of roasting device that may be utilized in carrying out the present invention; and in Figure 2, another form of device for this purpose.

The present invention is thus concerned with methods and devices or machines for rapidly roasting coffee and producing the finished product from the green bean and operations which may be readily carried out treating larger or smaller quantities of coffee beans, the latter being in the green stage, so that the final roasted coffee product may be directly supplied to the consumer on demand of the consumer, freshly made from the green bean. These methods and devices and the resulting products require rapid production of roasted coffee without loss of aroma and flavor qualities therefrom, in relatively simple and economical devices which are utilizable either in retail stores, or in the home itself, or may be used in enlarged conditions for roasting if desired at central distributing roasting plants.

In carrying out the present invention it has been found that if the green coffee bean is subjected to a preheating operation at a temperature insufficient to produce roasting, subsequent roasting operations may be readily carried out without loss of flavor and aroma qualities in the coffee and further, such preheating operations enable the rapid roasting of the coffee to be readily carried out. Most desirably the roasting is carried out in two stages in which the preheated coffee bean, while still in substantially green condition, is subjected to a pre-roast operation at a temperature and for a time insufficient to complete the roast of the bean but to convert it into a partially roasted condition, while the later stage involves a heat treatment for a time sufficient to roast the pre-roasted coffe bean. For rapid operation it has further been found desirable to subject coffee during the pre-roast treatment to a flattening operation so that during the pre-roast treatment the coffee beans are desirably simultaneously flattened into elongated disc-like wafers. In addition, such partially roasted elongated flattened disc-like wafers produced in the pre-roast operation are subjected to the final roasting treatment at the desired temperatures for the times necessary to complete the roast, while being subjected to pressure to convert them into a substantially flaked form. By heat treatment carried out in stages including a pre-heat treatment as set forth above, the roasted product is obtained having the fully developed flavor and aroma of the coffee bean without loss of oil or other ingredients therefrom. The successive heat treatment stages are particularly valuable in conditioning the bean for the final roasting operation and this is readily carried out particularly where flattening and flaking of the bean is simultaneously effected during the pre-roasting and later roasting operations respectively. The final roasted and flaked product retaining the full values of the coffee may be utilized directly, or may be reduced to a shredded condition, or to a powdered condition.

The treatments described above involve a continuity of operation on the coffee bean in which the beans are carried through several stages of treatment at increasing temperatures. It will also be noted that during such treatment, the beans are subjected to increasing pressures because of the set of the rolls desirably employed. The continuity of the process may be further illustrated by treating the beans continuously in zones of treatment where the pressures increase from each zone to the successive one so that the beans during treatment in the pre-roast stages are subjected to relatively light pressures which are increased until the highest pressures are reached in the later treatment zones. In such continuous processes where the beans are subjected to increasing pressures in a multiplicity of zones, the heat may be supplied to the beans in stages as set forth above so that there is a pre-roast zone and a later final roasting zone, or the heat to which the beans are subjected may be substantially the same throughout the treatment with increments of pressure at successive stages, because the beans pass through the earlier stages so rapidly that they have not been subjected to the heat for a sufficient time to produce a completely roasted product, and such completely roasted product only emerges from the later stages.

As illustrative of the methods that may be employed for this purpose, the following is given. The green coffee bean may be preheated to a temperature of approximately 200° F. Such preheat treatment conditions the bean for the roasting operation or for a pre-roasting operation and also conditions the beans so that they may be readily flattened without substantial rupture.

The preheated green coffee beans thus obtained are then subjected desirably to a pre-roasting operation carried out for example, at temperatures of about 400° F. which are sufficient to partially roast the coffee beans which have been subjected to the preheating operation. Furthermore, during such pre-roasting operation the coffee beans are desirably subjected to pressure as between rolls to flatten such preheated coffee during the pre-roasting operation into an elongated disc-like wafer. The pre-roast coffee product thus obtained is then desirably subjected to a final roasting operation as for example, at temperatures of 500° F. and for rapidity of operation it is desirable to subject the beans during such final roasting step to pressure to convert them into a flaked condition so that flaking and roasting take place simultaneously. For this purpose a pair of rolls may desirably be employed which rolls are heated to the temperatures desired, such roasting rolls taking the coffee from the pre-roast rolls and converting the pre-roasted coffee into the final roasted form and flaked condition. The simultaneously flaked and roasted coffee product thus obtained may be utilized as such for brewing operations or may if desired, be permitted to cool and subjected to a shredding operation, as for example, between rolls which may be partially heated, as for example, at temperatures of 100° F. and which rotate at different speeds so that the flakes or foil of roasted coffee are rapidly and readily powdered for use.

Figure 1 of the drawings illustrates one form of device which may be utilized for carrying out the present invention. As there illustrated, a vertical elongated container 1 has a hopper portion 2 for reception of the green coffee bean shown at 3. The hopper portion 2 may desirably be provided with a cover 4. Means are provided to preheat the beans 3 in the hopper 2 and such means may take the form of an electric heating coil 5 surrounding said hopper 2. Such heating coil desirably an electric heating coil, is not necessarily employed in connection with a closed container since the heat from the heating rolls described below used for pre-roasting and roasting operations, may be sufficient to preheat the beans to the desired temperature. From the hopper 2 the beans 3 pass to a pair of pre-roasting rolls 6 desirably positioned immediately below the outlet of the hopper 2 so that the beans falling upon the pre-roast rollers 6, 6 are gripped therebetween and carried between the pre-roast rolls and discharged downwardly therefrom. Such rolls may desirably be knurled or roughened to assist in the gripping of the bean 3 and the clearance between such rolls may be approximately $\frac{1}{32}$ of an inch. Such pre-roast rolls are desirably provided with heating means which may take the form of electric heating coils or gas heating units placed within the rolls.

From the pre-roast rolls the beans pass in a desirably flattened elongated disc-like form to the roasting rolls 7, 7 through a conduit 8. The roasting rolls 7, 7 are desirably set quite close together and maintained at the roasting temperature, of for example, about 500° F. by electric heating coils, gas elements or other heating elements (not shown) which may be utilized in any desirable way. In the roasting rolls or therebetween, the coffee is subjected to the final roasting operation and where the rolls are set quite close together the coffee emerges therefrom in the form of a roasted flaked condition, the roasting and flaking being completed simultaneously between the rolls 7, 7.

While the coffee in the flanked and roasted condition may be used as such, it may desirably be permitted to fall through the conduit 9 of sufficient length to partially cool the same down to a point at which some of the plasticity of the flaked product is lost and the flaked material is available for a grinding or reducing operation. This may be desirably carried out between rolls 10, 10 maintained at temperatures approximating room temperature and these rolls are desirably operated at differential speeds in order to convert the foil or flaked form of coffee received therebetween to a shredded condition. The reduced product falls from the rolls 10, 10 and is collected in the receptacle 11 placed therebelow. The container 1 may be provided with a hinged door 12 enabling ready access to the receiver 11 and may desirably be provided with a valve outlet 13 at its upper portion for removing vapors and gases as desired. A unitary device of the character illustrated and described above is particularly desirable because it retains all of the values of the coffee during the operation, and a unitary device of this character may be readily employed for use in the home or in the treatment of small quantities of coffee on demand produced directly in the store from the green beans by the distributor on demand of the purchaser. On the other hand the device lends itself to construction in large form for treatment of coffee by roasting methods carried out on a large scale.

In the form of device illustrated in Figure 2 of the drawings, the coffee beans are subjected to continuous pressure while being heated and pass from the green condition at the receiving end to the ultimate roasted condition at the delivery end. For this purpose there is illustrated the container 21 which may be provided with the hopper portion 22 for reception of the green coffee beans. From the hopper 22 the beans pass to a pair of endless band conveyors 23, 24, these conveyors being spaced apart to form a converging channel 25 therebetween, which channel has its greatest width at 26 immediately adjacent the delivery end of the hopper 22, the channel converging to its lower end where the distance between the bands as at 27, is quite small. To maintain these bands in position, they operate over pulleys, there being driving pulleys 28, 29 and end pulleys 30, 31. A series of idling pulleys 32, 33 are desirably employed between the driving pulleys 28, 29 and the end pulleys 30, 31, the idling pulleys cooperating with the other pulleys to maintain the desired positioning of the endless band conveyors 23, 24. Pulleys 34, 35 may be provided on the outer portions of the endless band conveyors for adjustment to permit tightening or loosening of the band members (by conventional means not shown). Scrapers 36, 37 are desirably provided acting against the endless band conveyors 23, and 24 respectively, for removing any material which adheres to the conveyors, the treated coffee beans being received in the container 38.

The beans may be heated by any desired means during the passage through the device of Figure 2, such heating means, for example, may take the form of electrical heating elements 39 which may be placed between each successive pair of idling pulleys 32, 33. The number of heating elements and the heat supplied will depend on the particular treatment being carried out. Any of the elements which contact with the coffee bean should desirably be made of material which is not affected by the coffee bean or oil so that desirably the endless band conveyors are made of stainless steel or Monel metal.

The operation of the device of Figure 2 will be apparent from the description thereof set forth above. The green beans fed into the channel between the endless conveyors 23, 24, from the hopper 22, pass down through the channel 25 where they are subjected to gradually increasing pressures and continuously to a heat treatment so that the treated beans emerge from the end of the channel in the desired roasted condition but in reduced form. Generally the product will emerge in substantially a powdered condition where it is collected in the receiver 38. Continuity of heat and pressure treatment is readily secured in a device of the character set forth in Figure 2 and while the channel has been shown to be of gradually converging type, it is apparent that the idlers may be set so that the channel between the endless band conveyors is divided into several successive zones where the pressures increase from one zone to the next but where the pressure in any particular zone is substantially the same. In other words, there can be, for example, three or more zones, the pressure in each zone being substantially the same but the pressure from one zone to the next, increasing substantially. Continuity of treatment, however, is more desirable.

The present invention thus readily permits the production of a roasted coffee by simple and economical methods converting the green bean directly to the final roasted condition without loss of value therefrom enabling the operation to be economically carried out in the treatment of green coffee beans of any desired blend, produced directly on demand of the consumer.

Treatment of the beans in accordance with the present invention preserves all of the values in the beans with very little if any, loss of aroma and flavor giving qualities. This is particularly true with the device shown in Figure 2. While oil is, of course, necessarily expressed to some extent during the pressure treatment of the beans in accordance with the present invention, such oil and other products appear to be reabsorbed into the products before they pass from the last treatment zone. Furthermore, the treatment of the beans in a continuous treatment zone or in zones placed successively one below the other, results in the fresh beans being in a position to contact with vapors formed from beans in the later stages so that some absorption necessarily takes place. It may be noted in this connection that advantage is taken of the fact that the coffee bean is of substantially porous character. In any event, whatever the explanation may be, treatment in accordance with the present invention results in a full flavored roasted coffee product from which substantially none of the values of the coffee bean have been lost.

Having thus set forth my invention, I claim:

1. The method of roasting coffee which comprises preheating the green coffee bean at a temperature substantially below roasting, flattening the preheated bean while heating it to pre-roast temperature insufficient to complete the roast, and flaking the partially roasted, flattened bean while heating it to a temperature sufficient to complete the roast.

2. The method of roasting coffee which comprises preheating the green coffee bean at a temperature substantially below roasting, and simultaneously flaking and roasting the preheated green coffee bean.

3. The method of roasting coffee which comprises preheating the green coffee bean at a temperature of substantially 200° F., flattening the preheated bean while heating it to a pre-roasting temperature of substantially 400° F. insufficiently to complete the roast, and flaking the partially roasted, flattened bean while heating it to a roasting temperature of about 500° F. to complete the roast.

4. In a method of roasting coffee, the steps of preheating the green coffee bean at a temperature substantially below roasting, and flattening the preheated bean while heating it to a pre-roast temperature insufficient to complete the roast and to convert the coffee into a partially roasted, relatively thick, elongated, flattened, disc-like particle.

5. In the method of roasting coffee, the steps of flattening the green coffee bean rapidly at a temperature sufficient to roast the bean partially but not to complete the roast to convert the green coffee bean into a relatively thick, elongated, disc-like, relatively thick particle in partially roasted condition.

6. The method of roasting coffee which comprises heating green coffee beans while subjecting them to pressure of increasing amounts until the beans are simultaneously roasted and compressed into flattened particles.

7. The method of roasting coffee which comprises continuously heating green coffee beans while subjecting them to continuously increasing pressures until the beans are simultaneously roasted and compressed into flattened particles.

8. The method of roasting coffee which comprises continuously subjecting green coffee beans to increasing temperatures and pressures until the beans are simultaneously roasted and compressed into flattened particles.

9. A coffee roasting device including means for preheating green coffee beans to a temperature substantially below roasting, means for flattening the preheated beans and heating them to a pre-roast temperature to partially roast the bean, and means for simultaneously flaking and roasting the beans.

10. A coffee roasting device including means for preheating green coffee beans to a temperature substantially below roasting and means for simultaneously flaking and roasting the preheated beans.

11. A coffee roasting device including means for preheating green coffee beans to a temperature substantially below roasting, heating rolls for flattening the preheated beans and heating them to a pre-roast temperature to partially roast the bean, and heating rolls for simultaneously flaking and completing the roasting of the beans.

12. A unitary coffee roasting device comprising a closed container, a hopper at the upper portion of said container for receiving green coffee beans, heating means adjacent said hopper to preheat the beans therein, a pair of pre-roast rolls positioned in said container below said hopper to receive the beans therefrom and to flatten and pre-roast the pre-heated beans, means for heating said pre-roast rolls, a second pair of rolls positioned in said container below said pre-roast rolls to receive pre-roasted beans therefrom and to flake and roast the beans simultaneously, and means for heating said last named rolls.

13. A unitary coffee roasting device comprising a container, a hopper carried by said container for receiving green coffee beans, a pair of endless band conveyors positioned in said container adjacent said hopper to receive the green beans therefrom, the conveyors being spaced from each other to form a converging channel within which the beans are treated, said channel having its greatest width adjacent the receiving end whereby beans in passing through said channel between the conveyors are subjected to increasing pressures, means for driving said conveyors, and means for heating the beans during the passage through the container.

TOBIAS DANTZIG.